L. D. GREEN.
ROTARY-PUMP.
No. 172,424. Patented Jan. 18, 1876.
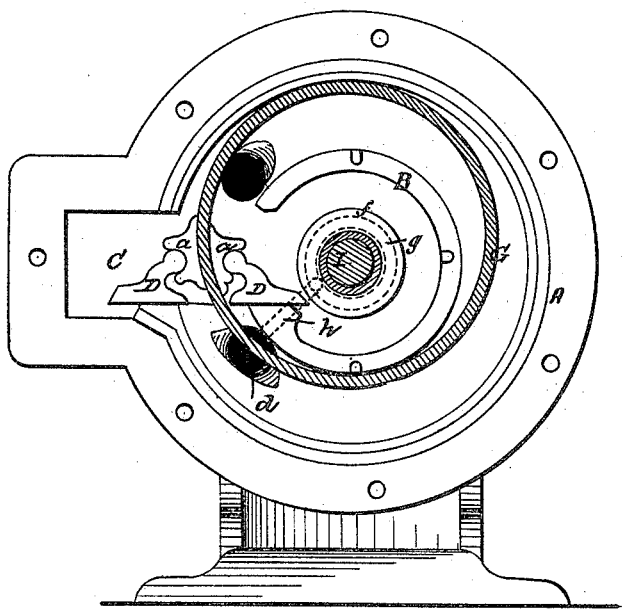
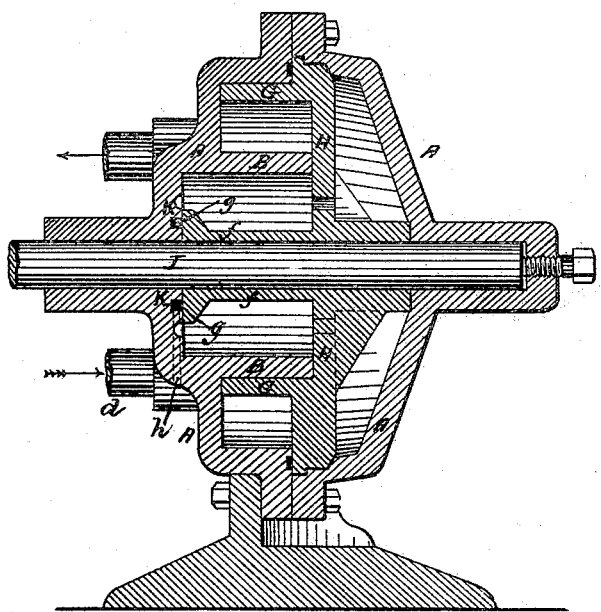

UNITED STATES PATENT OFFICE.

LYMON D. GREEN, OF WATERTOWN, NEW YORK, ASSIGNOR TO GEORGE A. BAGLEY AND EDMUND Q. SEWALL, OF SAME PLACE.

IMPROVEMENT IN ROTARY PUMPS.

Specification forming part of Letters Patent No. 172,424, dated January 18, 1876; application filed December 15, 1875.

*To all whom it may concern:*

Be it known that I, LYMON D. GREEN, of Watertown, Jefferson county, New York, have invented certain new and useful Improvements in Rotary Pumps and similar engines, of which the following is a specification:

My invention, while susceptible of a wide range of application, has been devised with special reference to the needs of the rotary force-pump for which Letters Patent No. 155,722 were issued to me October 6, 1874. It is in this connection that I have illustrated my invention in the accompanying drawing, in which—

Figure 1 is a longitudinal vertical section, and Fig. 2 is a transverse vertical section, of my patented rotary force-pump, with the addition of my present improvement.

A is the casing; B, the interior concentric ring; C, the valve-chest; D, the sliding valve, with tumblers $a$; G, the piston-ring attached to the piston head or plate H, which, in turn, is fixed to hub $f$, fast on shaft I. $z$ are the openings in the piston-head, to permit passage of water for the purpose of balancing the piston. These parts are arranged together, and operate in substantially the same manner as like parts represented in my aforesaid Letters Patent, and require no further description here.

In this pump there is but one point at which there is really any liability of leakage. This is where the driving-shaft extends through the casing. To some extent this liability is reduced by the bearing of hub $f$ against the seat K on the interior of the casing. To reduce this liability, however, to the minimum, I form in the seat K an annular groove, $g$, and from a point in the bottom of this groove I lead a passage or duct, $h$, into the suction-port $d$. The groove $g$ is thus in communication with the suction-port through the duct or passage $h$. The consequence of this arrangement is that, by the action of the water drawn in through the suction-port, whatever water may enter between the hub $f$ and seat K will pass into the groove $g$, and will thence be drawn at once through the passage $h$ into the suction-port. The effect of this operation is twofold: not only is the leakage entirely prevented, but, inasmuch as the piston is nicely balanced, the tendency to a vacuum, created by exhausting the water from the groove $g$, will have the effect of causing the hub to take a close and tight bearing against its seat.

I have described the groove as connected with the suction-port; but it may be connected with any other part of the pump, or of other machinery which will tend to exhaust the water from the groove as fast as it enters therein. The same plan of preventing leakage or of making a tight joint, or of accomplishing both these objects, may be employed in steam-engines and other connections where the groove intermediate between the two surfaces in contact can be connected with an exhaust.

Having described my invention, I shall state my claim as follows:

1. The described means for preventing leakage, consisting of an annular groove or channel interposed between the parts where the leakage is liable to occur, and in permanent communication, through a duct or intermediate passage, with an exhaust which tends to continuously draw from the same whatever of liquid or fluid may enter therein, substantially as set forth.

2. The combination, with the pump-case and rotary driving-shaft and hub, of the cylindrical bearing, provided on that face which is in contact with the hub with an annular channel or groove, connected by a duct or passage with the suction-port or other part acting as an exhaust, substantially as shown and described.

In testimony whereof I have hereunto signed my name this 13th day of December, A. D. 1875.

LYMON D. GREEN.

Witnesses:
SAML. NORTH,
THOS. KEENAN.